(12) United States Patent
Johnson

(10) Patent No.: US 6,410,932 B2
(45) Date of Patent: *Jun. 25, 2002

(54) RADIATION-SENSITIVE-DEVICE BASED LEVEL

(75) Inventor: Louis J. Johnson, Aloha, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,646

(22) Filed: Dec. 30, 1998

(51) Int. Cl.[7] ............................................... G01N 15/06
(52) U.S. Cl. ..................... 250/577; 250/573; 356/139.1; 356/249
(58) Field of Search .......................... 250/216, 573–577, 250/559.29; 356/139.1, 248, 249, 252–255, 436, 440; 33/377, 384, 366.15, 366.16, 366.22, 366.23, 366.14; 73/514.09, 293

(56) References Cited

U.S. PATENT DOCUMENTS

| | | | | |
|---|---|---|---|---|
| 3,464,276 A | * | 9/1969 | Leibert | .................... 73/514.09 |
| 4,182,046 A | * | 1/1980 | Ludlow et al. | .......... 33/366.16 |
| 5,761,818 A | * | 6/1998 | Hopkins et al. | ......... 33/366.14 |

* cited by examiner

Primary Examiner—Que T. Le
Assistant Examiner—Thanh X. Luu
(74) Attorney, Agent, or Firm—Mark V. Seeley

(57) ABSTRACT

An apparatus including an enclosure having an interior surface and an exterior surface; a first radiation sensor coupled to the interior surface being configured to produce a first signal dependent on the radiation sensed by the first radiation sensor; a second radiation sensor coupled to the interior surface being configured to produce a second signal dependent on the radiation sensed by the second radiation sensor; and a bus accessible from the exterior surface, the bus being coupled to the first radiation sensor and the second radiation sensor.

5 Claims, 2 Drawing Sheets

RADIATION-SENSITIVE-DEVICE BASED LEVEL

BACKGROUND OF THE INVENTION

1. Field of the Invention

The present invention relates to the field of levels; more particularly, the present invention relates to a radiation-sensitive-device based level.

2. Description of Related Art

Levels are typically used to determine whether a line or plane is perpendicular to the force of gravity. Levels are used in numerous applications.

One type of level is a structure that has a flat surface and a tubular container mounted to the structure such that the longitudinal axis of the tubular container is parallel to the length of the flat surface. The tubular container is partially filled with a liquid such that there is a bubble in the tubular container. Two lines are marked about the middle of the tubular container such that when the length of the flat surface is level, the bubble is between the two lines.

Some levels include a tubular container that is parallel to the width of the flat surface. Two lines are marked about the middle of the tubular container such that when the width of the flat surface is level, the bubble is between the two lines.

Some levels include a tubular container that is at some other orientation to the length (or the width) of the flat surface. Two lines are marked about the middle of the tubular container such that when the length and/or the width of the flat surface has a particular orientation to the level orientation, the bubble is between the two lines. For example, the tubular container may be oriented at a 45 degrees incline relative to the length of the flat surface. Thus, when the length of the flat surface rises at a 45 degree angle, the bubble in that tubular container is between the two lines.

Determining whether the bubble is centered between the lines may be difficult in poor lighting conditions or because of awkward positioning of the level relative to the line of sight. Therefore, it is desirable to provide a level that is readable in a wider range of conditions.

The orientation of the tubular containers is fixed relative to the flat surface of the level. Thus, the typical level can determine whether the orientation is one of a limited number of orientations defined by the fixed positions of the tubular containers relative to the flat surface. In some applications, it is desirable to determine whether a line has another orientation besides the standard ones, such as level and a 45 degree incline. For example, one may want to determine if a line is at a 30 degree incline.

In some applications, it is desirable to measure the orientation (for example, in degrees) rather than simply determine whether or not the level has a particular orientation or not. Furthermore, it may be desirable to periodically measure the orientation and store it.

What is needed is an apparatus to more easily determine the orientation of a line or a surface.

SUMMARY OF THE INVENTION

An apparatus including an enclosure having an interior surface and an exterior surface; a first radiation sensor coupled to the interior surface being configured to produce a first signal dependent on the radiation sensed by the first radiation sensor; a second radiation sensor coupled to the interior surface being configured to produce a second signal dependent on the radiation sensed by the second radiation sensor; and a bus accessible from the exterior surface, the bus being coupled to the first radiation sensor and the second radiation sensor.

DETAILED DESCRIPTION

In one embodiment, the present invention is an apparatus to more easily determine whether a line or a surface is level. In another embodiment, the present invention is an apparatus to determine whether a line or a surface has a user-selected orientation. In yet another embodiment, the present invention is an apparatus to measure the orientation of a line or a surface relative to a particular orientation, such as the level orientation.

In the following detailed description, numerous specific details are set forth in order to provide a thorough understanding of the described invention. Some of these specific details need not be used to practice the invention. In other instances, well-known structures, signals, and methods have not been shown in detail in order not to obscure the described invention.

Figure 1:
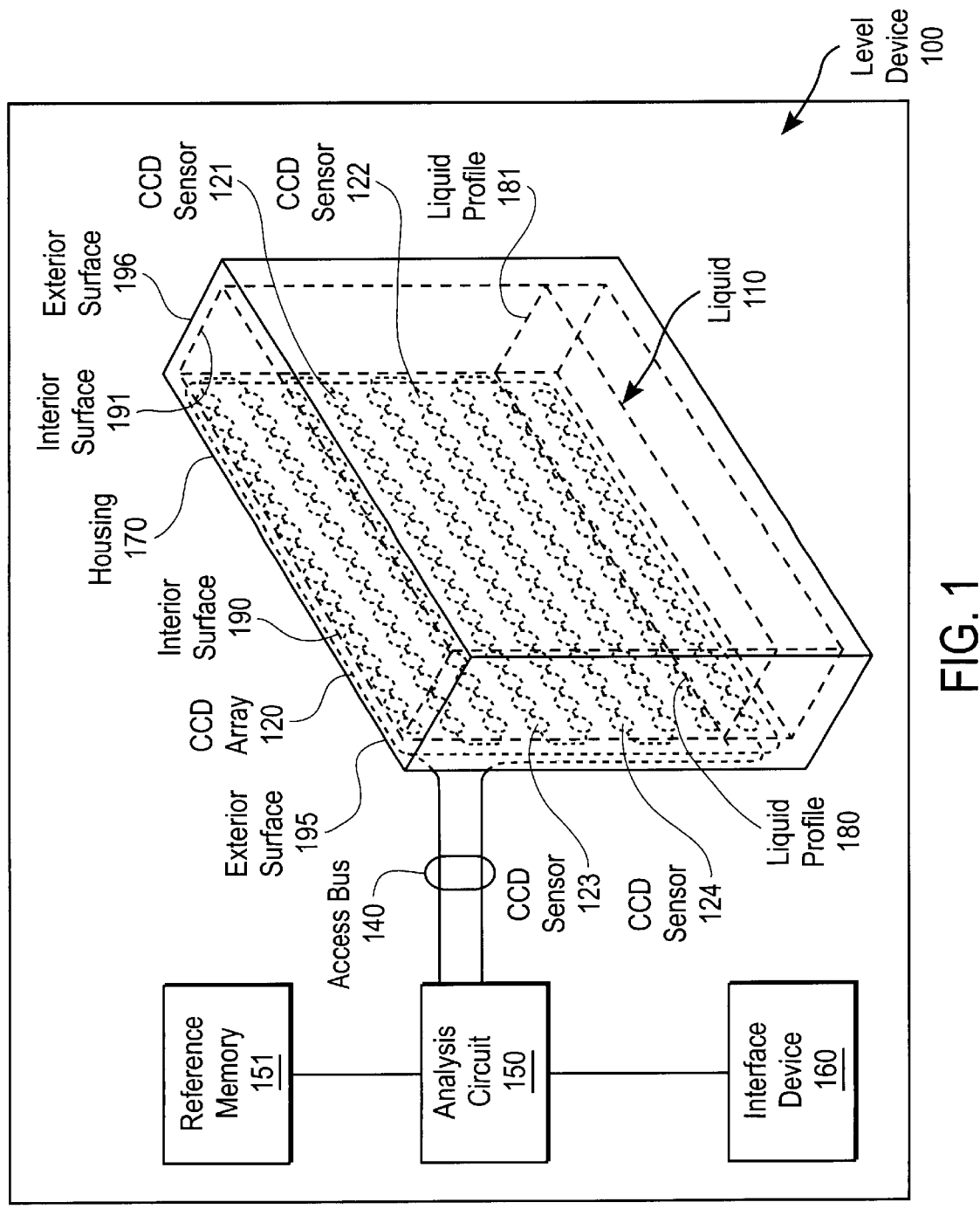
FIG. 1 illustrates one embodiment of a level device of the present invention.

FIG. 1 illustrates one embodiment of a level device of the present invention.

A level device 100 includes a container 170, an analysis circuit 150, a reference memory 151, and an interface device 160.

The container 170 has an interior surface 190 and an exterior surface 195. A charge couple device (CCD) array 120 is coupled to the interior surface 190. The CCD array 120 includes at least two CCD sensors coupled such that they are serially accessible through an access bus 140. The container 170 is partially filled with a liquid 110. When the container is oriented such that the plane of the CCD array 120 is approximately parallel to the force of gravity, a portion of the interior surface 190 is obscured by the liquid 110 and a portion of the interior surface is exposed to define a liquid profile 180 at the interface between the liquid 110 and the interior surface 190. The liquid profile 180 is a line that is level (perpendicular to the force of gravity).

In one embodiment, a portion of the container 170 is transparent to allow ambient radiation to enter the container 170. Alternatively, the level device 100 includes a radiation source to provide radiation within the container 170.

The liquid 110 is transparent or opaque to the radiation. The CCD sensors are sensitive to the radiation. When a CCD sensor is obscured by the liquid 110, the intensity of radiation incident to the CCD sensor is less than when the CCD sensor is not obscured by the liquid 110. In one embodiment, the radiation is visible light. Alternatively, the radiation is non-visible radiation or some combination of visible and non-visible radiation.

In one embodiment, the CCD array 120 is disposed between the interior surface 190 and the exterior surface 195 such that the CCD array 120 is not in direct contact with the liquid 110. The portion of the material between the CCD array 120 and the interior surface 190 is transparent to the radiation. Alternatively, the liquid 110 directly contacts the CCD array 120 and the liquid 110 is selected such that it does not interact with the CCD array 120 to cause malfunctions.

Each CCD sensor generates a signal corresponding to the intensity of the incident radiation. The CCD array 120 is coupled to the access bus 140. In one embodiment, the signals corresponding to each of the CCD sensors in the CCD array 120 are serially accessible through the access bus 140. Other access methods may be used. For example, each CCD sensor may be directly accessible through the access bus 140.

The analysis circuit 150 is coupled to the access bus 140 and the interface device 160. The analysis circuit 150 includes logic to access the signals from the CCD array 120 and determine the location of the liquid profile 180. In one embodiment, each signal is analog and the analysis circuit 150 compares each signal against a threshold voltage to determine if the CCD sensor corresponding to that signal is obscured by the liquid 110. Alternatively, each signal is a digital signal indicating whether that CCD sensor is obscured by the liquid 110.

In one embodiment, the threshold voltage is set at the midpoint between the voltage of the signal generated by a first reference CCD sensor that is known to be exposed and the voltage of the signal generated by a second reference CCD sensor that is known to be obscured. For example, the two reference CCD sensors may be positioned within the container 170 such that both reference CCD sensors cannot be covered by the liquid 110 at the same time. In another embodiment, the threshold voltage is the midpoint between the maximum voltage generated by a CCD sensor and the minimum voltage generated by a CCD sensor when the CCD array 120 is accessed. Alternatively, the threshold voltage is the midpoint between the maximum expected voltage generated by an obscured CCD sensor and the minimum expected voltage generated by an exposed CCD sensor. The expected voltages may be based, for example, on the manufacturing tolerances of the radiation source and the CCD sensors and the degree that the liquid 110 transmits incident radiation (transparency). Other methods of selecting a threshold value may be used.

In one embodiment, the interface device 160 is used to provide information to a user. The information may include an indication as to whether or not the level device 100 is level and/or a measurement of the orientation in degrees. In one embodiment, the interface device 160 includes a light emitting diode that is on when the level device 100 is level. In another embodiment, the interface device 160 includes a sound source that generates a sound when the level device 100 is level. In yet another embodiment, the interface device 160 includes a display that is used to indicate whether or not the level device 100 is level. In addition, the display may be used to graphically indicate the measured orientation or textually indicate the orientation in units such as degrees. Furthermore, the interface device 160 may interface with another device used to periodically sample the output of the analysis circuit 150. In one embodiment, one or more of these measurements are stored in a memory, such as random-access memory (RAM), magnetic tape, or a hard-disk drive.

In one embodiment, the interface device 160 holds measurements in a memory or on the display in response to an input by the user, such as pressing a button. Thus, the user may hold a measurement for reading in better lighting conditions or in order to save it for subsequent reference, for example.

There are numerous methods to analyze the signals from the CCD array 120 to determine whether or not the level device 100 is level or to provide a measurement of the orientation in degrees or radians, for example.

In one embodiment, a CCD sensor 121 and a CCD sensor 124 are laterally positioned on the interior surface 190 such that they are both slightly below the surface of the liquid 110 when the level device 100 is level. Thus, when the level device 100 is level, neither the CCD sensor 121 nor the CCD sensor 124 are exposed. If the left side of the level device 100 rises from the level orientation to a sufficient degree, the liquid profile 180 will fall relative to the CCD sensor 121 to expose it. Similarly, if the right side of the level device 100 rises from the level orientation to a sufficient degree, the liquid profile 180 will fall relative to the CCD sensor 124 to expose it. Thus, the analysis circuit 150 is configured to indicate that the level device 100 is level if neither the CCD sensor 121 nor the CCD sensor 124 is exposed. The distance the CCD sensors are placed from the surface of the liquid 110 relative to the distance between the CCD sensors (as measured when the level device 100 is level) determines the range of angles that will be considered level.

Alternatively, the two CCD sensors may be placed slightly above the surface of the liquid such that when the level device 100 is determined to be level when neither of the two CCD sensors is obscured.

In another embodiment, a first column of CCD sensors and a second column of CCD sensors are laterally positioned on either side of the interior surface 190 such that both columns are perpendicular to the liquid profile 180 when the level device 100 is level. Each CCD sensor in the first column of CCD sensors has a corresponding CCD sensor in the second column of CCD sensors such that the corresponding pair of CCD sensors are the same distance from the liquid profile 180 (measured along the line perpendicular to the liquid profile 180) when the level device 100 is level. The level device 100 is determined to be level when each of the corresponding pairs of CCD sensors have the same status. For example, in a case where each column of CCD sensors has 20 CCD sensors, if 8 corresponding pairs of CCD sensors are both obscured and the other 12 corresponding pairs of CCD sensors are both exposed, the level device 100 is determined to be level. On the other hand, if one of the corresponding pairs of CCD sensors have one CCD sensor that is obscured and the other CCD sensor that is exposed, the device is determined to not be level. The density of the CCD sensors in each column and the distance between the two columns determines the range of angles that will be considered level.

In another embodiment, the relative position of each CCD sensor is used to measure the orientation in degrees for example. An X-axis that is level and a Y-axis that is perpendicular to the X-axis is used. The two-dimensional position of the CCD sensors in the CCD sensor array is described herein by assigning XY positions when the level device 100 is level while the CCD sensor array is in the XY plane (reference position) and when the level device 100 is in a measurement position.

The reference position may be stored in the level device 100 in a reference memory 151 as part of the manufacturing process. Thus, the level device 100 is affixed to a level structure which is positioned to be level. The level device 100 stores the state of selected CCD sensors in the CCD array 120 in response to a store first reference position signal. This is the reference position against which measurement positions are compared.

In another embodiment, the level device 100 stores a second reference position in the reference memory 151 in response to a store second reference position signal. The level device 100 is configured to use either the first or second reference position according to user input, such as a switch. For example, this capability may be used to store the position of an arbitrary orientation. When the second reference position is selected, the level device 100 indicates when the level device 100 is in that arbitrary orientation. Alternatively, the level device 100 provides measurements in degrees or radians, for example, relative to that arbitrary position.

In one embodiment, a first column of CCD sensors and a second column of CCD sensors is used. Each of the CCD sensors in the first column of CCD sensors has the same X coordinate, X1, and a Y coordinate, Y1(m), where m is the number of the CCD sensor in the first column of CCD sensors sequentially numbered from the lowest to the highest Y-coordinate (as determined when the level device 100 is level). Each of the CCD sensors in the second column of CCD sensors has the same X coordinate, X2, and a Y coordinate, Y2(n), where n is the number of the CCD sensor in the second column of CCD sensors sequentially numbered from the lowest to the highest Y-coordinate (as determined when the level device 100 is level). The analysis circuit 150 determines m such that CCD sensor m is obscured and CCD sensor m+1 is exposed. Thus, the liquid profile 180 passes through the point between [X1, Y1(m)] and [X1, Y1(m+1)]. The analysis circuit 150 determines n such that CCD sensor n is obscured and CCD sensor n+1 is exposed. Thus, the liquid profile 180 passes through the point between [X2, Y2(n)] and [X2, Y2(n+1)]. One method to compute the angle is to assume the liquid profile 180 passes through the midpoint of the pairs of Y coordinates, Y1m(m,m+1) and Y2m(n,n+1). Thus, the angle, Θ, (relative from level) is computed as follows.

$$\Theta = -SIN^{-1}\left(\frac{Y2m(m, m+1) - Y1m(n, n+1)}{X2 - X1}\right)$$

The resolution of the measurement depends on the density of CCD sensors in each column and the distance between each column. Denser positioning of the CCD sensors allows the position of the liquid profile to be more precise. A wider spacing of the two columns allows the angle to be determined more precisely.

It will be apparent to one skilled in the art that the CCD array 120 may have numerous arrangements. For example, the CCD array 120 may include three or more columns of CCD sensors. In addition, numerous methods may be used to interpret the signals from the CCD array 120 to determine the liquid profile 180. For example, pattern recognition techniques may be used.

In one embodiment, the interpretation of the signals from the CCD array 120 includes the ability to respond to the detection of defective CCD sensors in the CCD array 120. For example, alternative CCD sensors may be selected for use when the primary CCD sensors are determined to be defective. Alternatively, the analysis may recognize a degree of reduced accuracy due to defective CCD sensors. The ability to recognize and/or compensate for defective CCD sensors allows the use of CCD arrays with defective CCD sensors. This provides a use for CCD arrays that may otherwise be discarded.

In one embodiment, the interior surface 190 is at a right angle to an interior surface 191. A second CCD array is coupled to the surface of the interior surface 191 and a liquid profile 181 is defined at the interface between the liquid 110 and the interior surface 191. The methods and apparatus described above are used to determine the orientation of the level device 100 relative to the line in the plane of the interior surface 191. Thus, the orientation of the level device 100 may be determined in two-dimensions.

In one embodiment, the exterior surface 195 of the container 170 is used to apply to the surface to be leveled (or whose orientation is to be measured).

Figure 2:
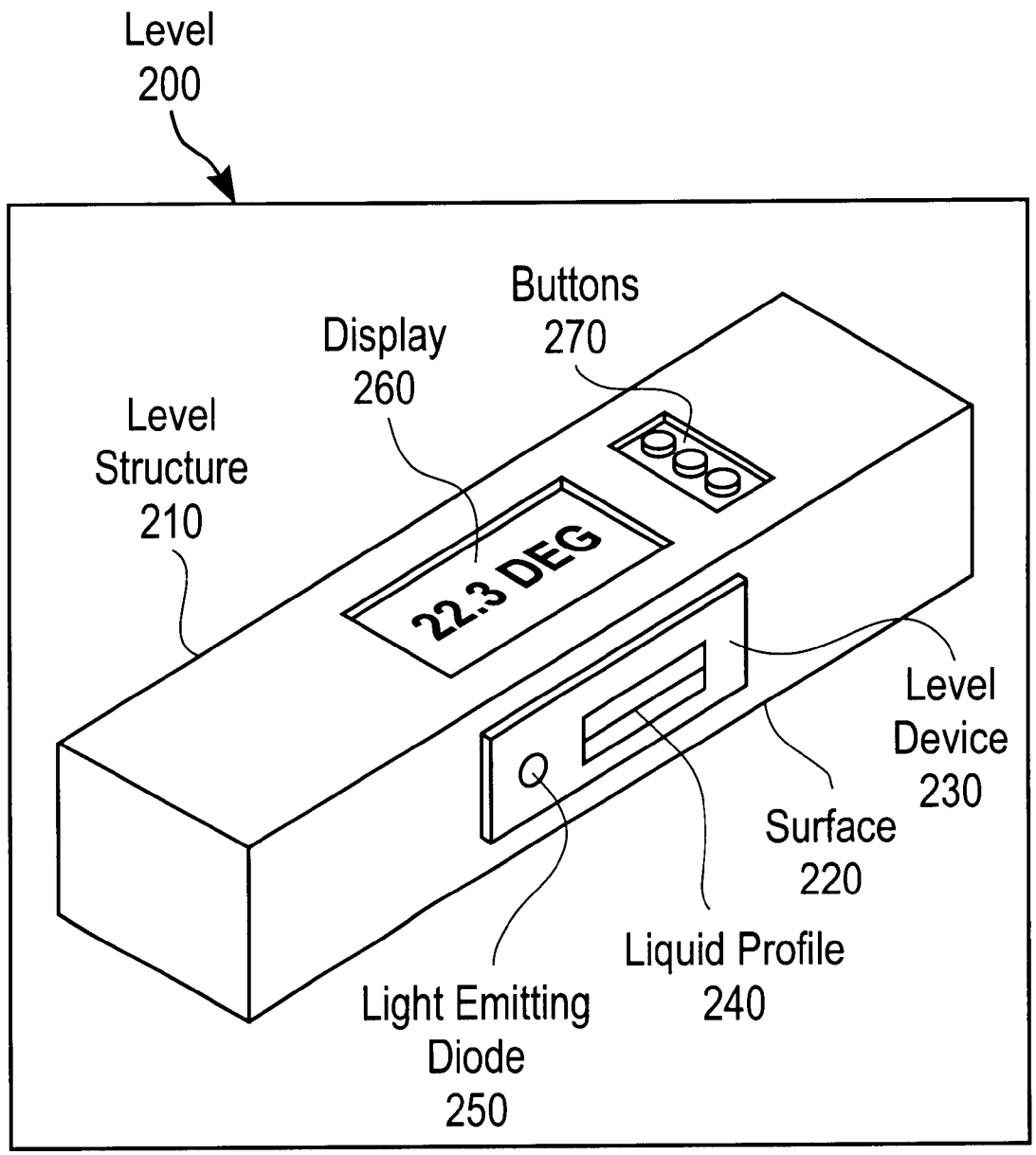
FIG. 2 illustrates one embodiment of a level of the present invention.

FIG. 2 illustrates one embodiment of a level of the present invention.

A level 200 includes a level structure 210 and a level device 230. The level structure has a surface 220 that is applied to the surface to be leveled (or whose orientation is to be measured). The level device 230 is mounted to the level structure 210 such that it indicates that it is level when the surface 220 is level.

The level structure 210 includes a display 260 to provide a graphical and or numerical indication of the orientation. The level structure also includes a set of buttons 270 to provide user input to switch modes, activate functions, store reference positions, and hold measurements, for example. Other means of user input, such as switches, may be used.

Numerous specific details are set forth in order to provide a thorough understanding of the described invention. Some of these specific details need not be used to practice the invention. In one embodiment, the liquid 110 is visible to the user through a window that includes graduation marks to provide for manual orientation readings as prior art level devices. Furthermore, the present invention is not limited to CCD arrays. Other radiation sensitive devices, such as a complementary metal oxide semiconductor (CMOS) image sensing array, may be used.

In other instances, well-known structures, signals, and methods have not been shown in detail in order not to obscure the described invention. For example, a power source, such as a battery, is not shown in the figures.

What is claimed is:

1. An apparatus comprising:

an enclosure having first, second, third and fourth interior surface and an exterior surface, the first interior surface oriented at a right angle to the second interior surface and oriented at a right angle to the third interior surface, the fourth interior surface oriented at a right angle to the second interior surface and oriented at a right angle to the third interior surface, the first interior surface oriented parallel to the fourth interior surface, the second interior surface oriented parallel to the third interior surface, and the first interior surface having a top edge and a bottom edge, the enclosure being partially filled with an opaque liquid, the liquid having a planar surface and directly contacting the first, second, third and fourth interior surfaces to define a liquid profile at the interface between the liquid's surface and the first interior surface, at the interface between the liquid's surface and the second interior surface, at the interface between the liquid's surface and the third interior surface, and at the interface between the liquid's surface and the fourth interior surface;

a first array of charge couple device sensors for sensing radiation, the first array located inside the enclosure with each sensor contacting the first interior surface, the array comprising at least three columns, each column having at least two sensors, the comlumns extending from the top edge of the first interior surface to the bottom edge of the first interior surface, each sensor being configured to produce a signal that is dependent on radiation sensed by the sensor;

a second array of charge choke device sensors for sensing radiation, the second array located inside the enclosure with each sensor contacting the second interior surface, each sensor being configured to produce a signal that is dependent on radiation sensed by the sensor, the third and fourth interior surfaces not being coupled to any charge couple device sensors;

a bus accessible from the exterior surface, the bus being coupled to each sensor;

an analysis circuit coupled to the bus, the analysis circuit including logic to receive signals from the first array and the second array, to determine the orientation of the liquid profile in two-dimensions, and to indicate a measured orientation;

a display for indicating the measured orientation; and a memory for storing the measured orientation.

2. The apparatus of claim 1 wherein the enclosure has a region that is transparent to radiation.

3. The apparatus of claim 1 further comprising a source of radiation configured to provide radiation in the enclosure.

4. The apparatus of claim 1 wherein the display further comprises a light source, the light source indicating whether the orientation is within a target range.

5. The apparatus of claim 1 wherein the display further comprises a sound source, the sound source indicating whether the orientation is within a target range.

* * * * *